US012014886B2

(12) United States Patent
Lin et al.

(10) Patent No.: US 12,014,886 B2
(45) Date of Patent: Jun. 18, 2024

(54) KEY STRUCTURE

(71) Applicant: CHICONY ELECTRONICS CO., LTD., New Taipei (TW)

(72) Inventors: Dian-Yu Lin, New Taipei (TW); Chao-Chin Hsieh, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/869,330

(22) Filed: Jul. 20, 2022

(65) Prior Publication Data

US 2023/0187148 A1 Jun. 15, 2023

(30) Foreign Application Priority Data

Dec. 9, 2021 (TW) ................................ 110146035

(51) Int. Cl.
*H01H 13/14* (2006.01)
*H01H 13/20* (2006.01)

(52) U.S. Cl.
CPC ............ *H01H 13/14* (2013.01); *H01H 13/20* (2013.01); *H01H 2233/07* (2013.01)

(58) Field of Classification Search
CPC .... H01H 13/14; H01H 13/20; H01H 2233/07; H01H 3/12; H01H 3/125; H01H 13/70; H01H 13/7065; H01H 13/84; H01H 13/85; H01H 2215/004; H01H 2215/014; H01H 2215/03; H01H 2227/026; H01H 2227/022
See application file for complete search history.

(56) References Cited

U.S. PATENT DOCUMENTS 4,127,752 A * 11/1978 Lowthorp ............ H01H 13/702 200/275
5,986,228 A * 11/1999 Okamoto ........... H01H 13/7006 200/516
6,995,324 B2 * 2/2006 Asada .................... H01H 13/48 200/1 B
10,403,451 B2 * 9/2019 Ito ........................ H01H 13/023
2002/0092753 A1 * 7/2002 Asada ................ H01H 13/7006 200/406

FOREIGN PATENT DOCUMENTS

CN 209343969 U 9/2019
TW M556918 U 3/2018

* cited by examiner

*Primary Examiner* — Lheiren Mae A Caroc
(74) *Attorney, Agent, or Firm* — MUNCY, GEISSLER, OLDS & LOWE, PC

(57) ABSTRACT

A key structure includes a circuit board, a keycap, an elastic member and a metal member. The keycap has a bottom facing the circuit board. The elastic member is disposed between the circuit board and the keycap. The elastic member includes a dome portion, a hollow portion, and a contact pillar. The dome portion touches the bottom of the keycap. The hollow portion is located inside of the dome portion. The contact pillar is located in the hollow portion, and the contact pillar extends from the dome portion to the circuit board. The metal member covers the outside of the contact pillar. The metal member comprises a trigger portion, and the trigger portion is a convex portion extending toward the circuit board.

12 Claims, 11 Drawing Sheets

KEY STRUCTURE

BACKGROUND

1. Technical Field

The disclosure relates to a key structure.

2. Description of the Related Art

A keyboard is commonly used in conjunction with a computer as one of the essential input devices. Generally, most computers and peripheral devices used with computers are progressively developed to be lighter, thinner, and more compact in design. Keyboards have also been reduced in volume over time. Earlier keyboards were relatively large, while slim keyboards are very common today. The slim keyboard usually uses a membrane circuit board and is also known as a membrane keyboard. The main structure of the membrane keyboard includes a membrane circuit board, a plurality of elastic members and a plurality of keycaps. The switch of the membrane circuit board is triggered by pressing the keycap, and the elastic member provides a force for returning the keycap to its original position.

Generally, a rubber dome is used as the elastic member, and the stroke and feel of pressing the keys are determined by the rubber dome. However, the feel of pressing a key with a rubber dome switch is inferior to the feel of pressing a key with a mechanical switch. There is indeed a need for improvement.

SUMMARY

In view of the above-mentioned problems, the main object of the disclosure is to provide a key structure with a metal member covering an elastic member to solve the problem of the poor feel of pressing a key having the key structure of the prior art.

In order to achieve the above object, the disclosure provides a key structure, which comprises a circuit board, a keycap, an elastic member and a metal member. The keycap has a bottom facing the circuit board. The elastic member is disposed between the circuit board and the keycap. The elastic member comprises a dome portion, a hollow portion, and a contact pillar. The dome portion touches the bottom of the keycap. The hollow portion is located inside the dome portion. The contact pillar is located in the hollow portion, and the contact pillar extends from the dome portion to the circuit board. The metal member covers the outside of the contact pillar. The metal member comprises a trigger portion, and the trigger portion is a convex portion extending toward the circuit board.

According to an embodiment of the disclosure, the metal member further comprises at least one weakening portion. The metal member is bent at the weakening portion and sleeved on the outside of the contact pillar.

According to an embodiment of the disclosure, the weakening portion is an annular structure.

According to an embodiment of the disclosure, there is a first space between the metal member and the contact pillar.

According to an embodiment of the disclosure, the circuit board comprises at least one switch, and the trigger portion corresponds to the switch.

According to an embodiment of the disclosure, the trigger portion has an outer edge and a center. A thickness of the trigger portion gradually increases from the outer edge to the center.

According to an embodiment of the disclosure, the keycap further comprises a rib disposed on the bottom. The elastic member further comprises a through hole located in the contact pillar, and the rib is accommodated in the through hole.

According to an embodiment of the disclosure, there is a second space between the metal member and the rib.

According to an embodiment of the disclosure, the key structure further comprises a metal dome disposed on the circuit board and located in the hollow portion of the elastic member. The metal dome comprises at least one limiting portion located on a side of the metal dome facing the contact pillar.

According to an embodiment of the disclosure, when the keycap is pressed, the contact pillar is located inside the limiting portion.

According to an embodiment of the disclosure, there is a third space between the metal dome and the circuit board.

According to an embodiment of the disclosure, the metal member is formed on the outside of the contact pillar by means of insert molding or injection molding.

In continuation of the description above, the key structure of the disclosure comprises a circuit board, a keycap, an elastic member and a metal member. The elastic member further comprises a dome portion, a hollow portion and a contact pillar. The hollow portion is located in the dome portion. The contact pillar is located in the hollow portion, and the contact pillar extends from the dome portion to the circuit board. The metal member covers the outside of the contact pillar. When a user presses the keycap of the key structure of the disclosure, the collapse and deformation of the elastic member can provide tactile feedback. At the same time, the contact pillar and the metal member outside thereof move downward and touch the circuit board so as to provide tactile feedback and the sound of the metal member contacting the circuit board. The tactile feedback and sound provided by the impact of the metal member are similar to the tactile feedback provided by pressing a key with a mechanical switch and constitute improvement of the tactile feedback provided by a key structure with a rubber dome (i.e., the elastic member).

DETAILED DESCRIPTION OF THE EMBODIMENTS

In order to make the structure, characteristics, and effectiveness of the disclosure further understood and recognized, a detailed description of the disclosure is provided as follows, along with embodiments and accompanying figures.

Figure 1A:
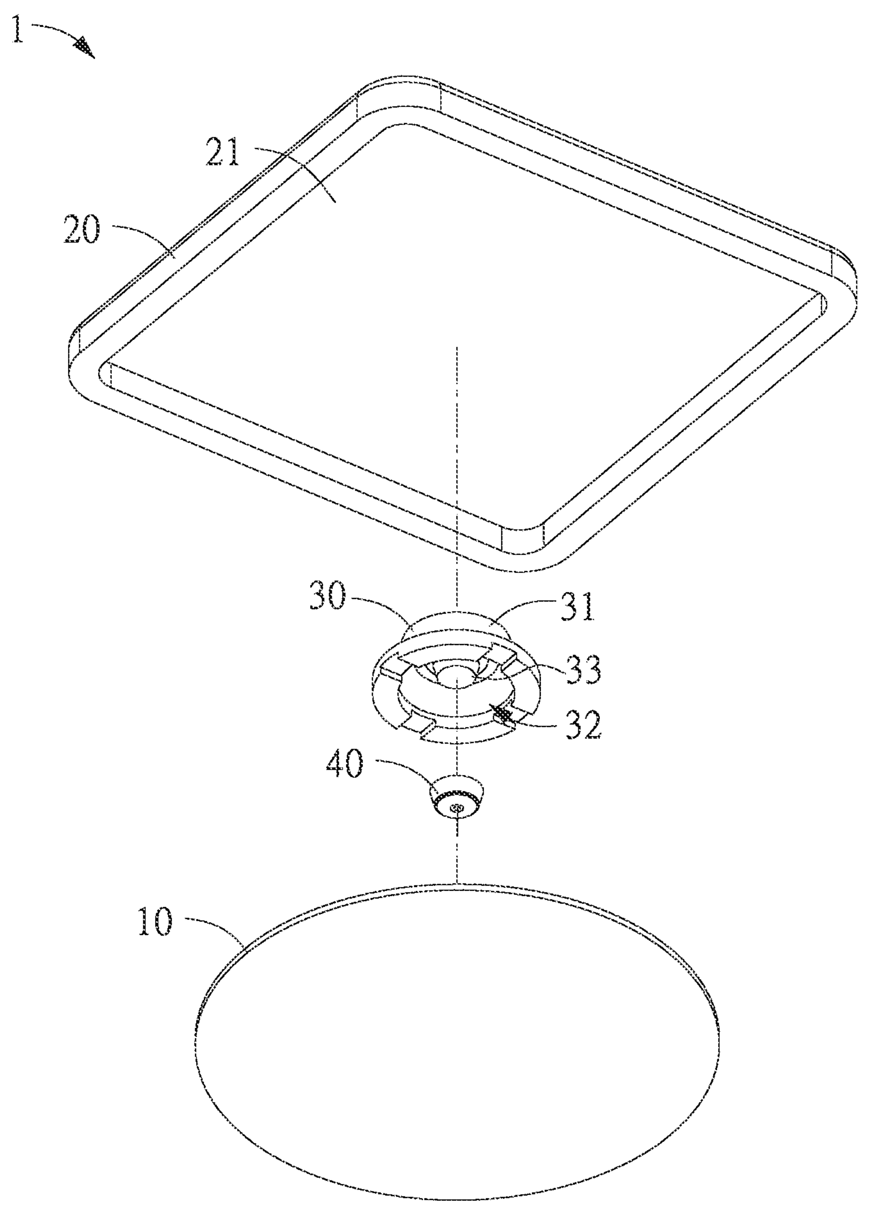
FIG. 1A is an exploded schematic diagram of a key structure according to the first embodiment of the disclosure.
Figure 1B:
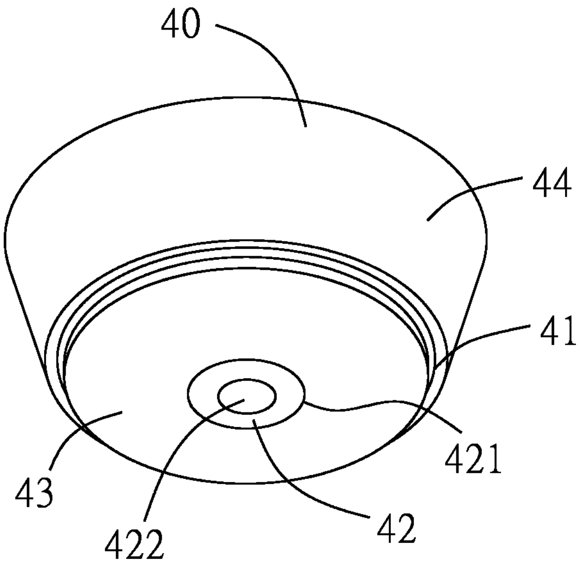
FIG. 1B is an enlarged view of the metal member shown in FIG. 1A.
Figure 2A:
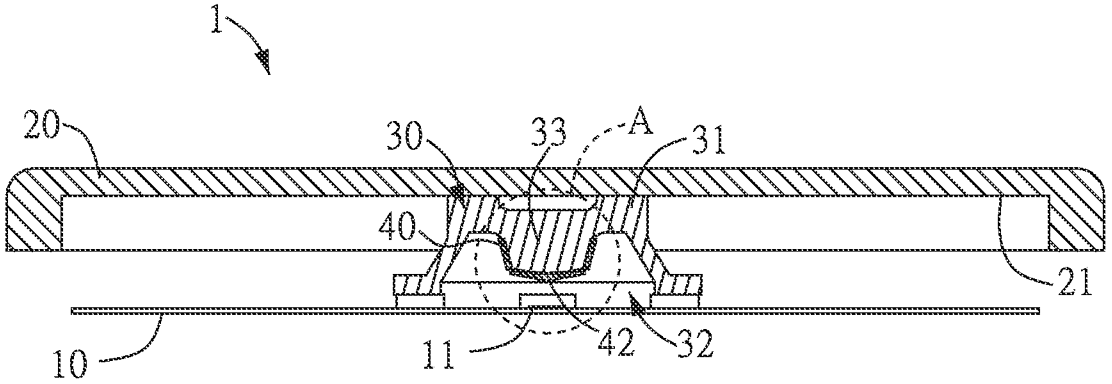
FIG. 2A is a sectional schematic diagram of the key structure shown in FIG. 1A in the assembled state.
Figure 2B:
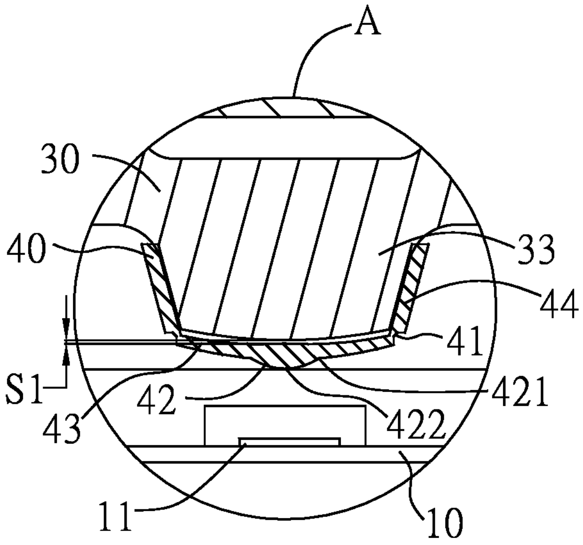
FIG. 2B is an enlarged view of a circled area A shown in FIG. 2A.

With reference to FIG. 1A, FIG. 1B, FIG. 2A and FIG. 2B. FIG. 1A is an exploded schematic diagram of a key structure according to the first embodiment of the disclosure; FIG. 1B is an enlarged view of the metal member shown in FIG. 1A; FIG is a sectional schematic diagram of the key structure shown in FIG. 1A in the assembled state; and FIG. 2B is an enlarged view of a circled area A shown in FIG. 2A. In this embodiment, the key structure 1 comprises a circuit board 10, a keycap 20, an elastic member 30 and a metal member 40. The key structure 1 may be applied to a membrane keyboard, and the circuit board 10 is a PCB membrane switch. Generally, the membrane keyboard further comprises a base plate and a scissor-type connecting member (not shown in figures). The circuit board 10 is disposed on the base plate, and the scissor-type connecting member connects to the keycap 20 and the base plate. Specifically, the base plate has a plurality of hooks for connecting the scissor-type connecting member, and the circuit board 10 has a plurality of openings (not shown in figures) corresponding to the hooks, such that one end of the scissor-type connecting member can be assembled to the base plate through the opening. Another end of the scissor-type connecting member connects to the keycap 20 so that the keycap 20 can be assembled to the base plate by the scissor-type connecting member and can be guided to move up and down relative to the base plate by the scissor-type connecting member.

It should be noted that the appearance of the circuit board 10 corresponds to that of the membrane keyboard, such as a rectangle, and the figures of the disclosure only show a part of the circuit board 10. Specifically, the circuit board 10 has conductive silver paste wires, and a shape of each of the silver paste wires corresponding to a keycap 20 has a larger area. For example, FIG. 1A shows a silver paste wire with a circular shape as the part of the circuit board 10 corresponding to the keycap 20 of one key structure 1. Further, the circuit board 10 comprises a plurality of switches 11 located on the silver paste wires. Similarly, each key structure 1 corresponds to one of the switches 11, so the figures of the disclosure show one switch 11.

The keycap 20 has a bottom 21 facing toward the circuit board 10. The elastic member 30 is disposed between the circuit board 10 and the keycap 20. In this embodiment, the elastic member 30 is a rubber dome. The elastic member 30 comprises a dome portion 31, a hollow portion 32 and a contact pillar 33. The elastic member 30 is disposed on the circuit board 10 and corresponds to one switch 11. The top of the dome portion 31 touches the bottom 21 of the keycap 20, and the hollow portion 32 is located inside the dome portion 31. Thus, when the keycap 20 is pressed, the keycap 20 presses the dome portion 31 of the elastic member 30 downward, and the elastic member 30 is collapsed and deformed due to the structure of the hollow portion 32 to provide tactile feedback.

Furthermore, the contact pillar 33 is located in the hollow portion 32, and the contact pillar 33 is a convex portion extending from the dome portion 31 to the circuit board 10 and corresponding to the switch 11. In this embodiment, the key structure 1 further comprises the metal member 40, which covers the outside of the contact pillar 33. It should be noted that the metal member 40 of the embodiment only covers the outside of the contact pillar 33 and does not touch the inside of the dome portion 31. Thus, when the elastic member 30 is pressed, the structure of the metal member 40 does not affect the collapse and deformation of the elastic member 30 and dome portion 31. Furthermore, the metal member 40 comprises a central portion 43 and a side wall portion 44, and the side wall portion 44 fits the outside of the contact pillar 33.

Preferably, the metal member 40 further comprises at least one weakening portion 41. In this embodiment, the weakening portion 41 refers to a stress weakening structure, which can be easily deformed by a force (e.g., the force of closing a mold). Specifically, the weakening portion 41 may be, but is not limited to, a hole, a groove, or another thinned structure. The metal member 40 is a metal plate before forming and comprises the weakening portion 41. When the metal member 40 is formed on the outside of the contact pillar 33, then the dispersal of pressure through the structure of the weakening portion 41 allows the metal member 40 to be bent at the position of the weakening portion 41 to form a U-shaped structure (i.e., the central portion 43 and the side wall portion 44) sleeved on the outside of the contact pillar 33, as shown in FIG. 2A and FIG. 2B. In other words, the weakening portion 41 can reduce the stress resistance of the metal member 40 to prevent the metal member 40 from being unsuitably rigid. It should be noted that the metal member 40 shown in FIG. 1A and FIG. 1B is in the bent state.

In this embodiment, the metal member 40 is formed on the outside of the contact pillar 33 by insert molding or co-injection molding, but the disclosure is not limited thereto, and insert molding is used here for exemplification. In one embodiment, the metal member 40 in the form of a metal plate is pre-placed in a mold and placed in position for forming the contact pillar 33 in the mold. Then, after the mold is closed, a rubber material is injected. The metal member 40 is bent by the force of closing the mold, and an elastic member 30 and a metal member 40 covering the outside of the contact pillar 33 are formed at the same time. In another embodiment, the elastic member 30 can be first made by injecting the rubber material. Subsequently, the metal member 40 and the elastic member 30 are placed in the mold. Similarly, the metal member 40 is bent by the force of closing the mold and covers the outside of the contact pillar 33.

Furthermore, the size of the metal member 40 and the position of the weakening portion 41 can be adjusted according to a width of the contact pillar 33. In this embodiment, the weakening portion 41 may be an annular structure. An inner diameter of the weakening portion 41 may be slightly greater than the width of the contact pillar 33 so that the metal member 40 can be properly sleeved on the contact pillar 33 after the weakening portion 41 is bent. In this embodiment, the weakening portion 41 is an annular groove and is also an annular thinning structure.

Figure 2C:
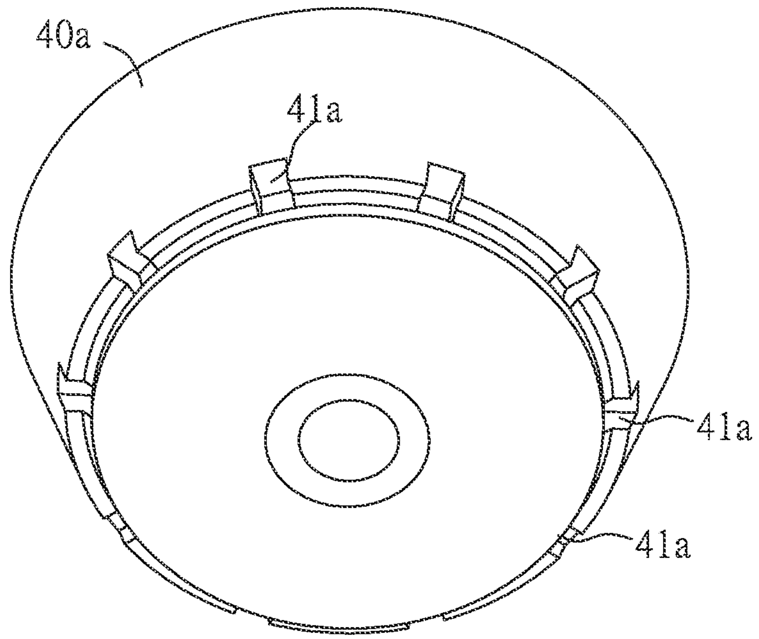
FIG. 2C is an enlarged view of the metal member shown in FIG. 1A according to another embodiment.

With reference to FIG. 1A and FIG. 2C. FIG. 2C is an enlarged view of the metal member shown in FIG. 1A according to another embodiment. In this embodiment, the metal member 40*a* comprises a plurality of weakening portions 41*a*. The weakening portions 41*a* are disposed at intervals, as described above; the weakening portions 41*a* may be grooves, thinning structures, or holes, and the holes are used here for exemplification. Further, the weakening portions 41*a* are disposed at intervals according to the bottom shape of the contact pillar 33; for example, the weakening portions 41*a* may be disposed at intervals in a ring shape. Preferably, the weakening portions 41*a* may also be disposed symmetrically.

As described above, when the keycap 20 is pressed, the collapse and deformation of the elastic member 30 can provide tactile feedback, while at the same time, the contact pillar 33 and the metal member 40 outside thereof move downward and touch the circuit board 10, so as to provide tactile feedback and the sound of the metal member 40 contacting the circuit board 33. The tactile feedback and sound provided by the impact of the metal member 40 are similar to the tactile feedback provided by pressing a key with a mechanical switch, thereby constituting the improvement of the tactile feedback provided by the key structure 1 with a rubber dome.

In this embodiment, the metal member 40 further comprises a trigger portion 42, which is a convex portion extending from the central portion 43 toward the circuit board 10. Preferably, the trigger portion 42 is a convex portion with a circular arc shape. Specifically, the trigger portion 42 has an outer edge 421 and a center 422. A thickness of the trigger portion 42 gradually increases from the outer edge 421 to the center 422. In other words, the center 422 of the trigger portion 42 is more protruding (i.e., thicker), and the thickness declines with increased proximity to the outer edge 421. The trigger portion 42 corresponds to the switch 11, and the center 422 corresponds to the switch 11. When the keycap 20 is pressed, the trigger portion 42 contacts the switch 11 to generate a corresponding input signal. Further, the trigger portion 42 of this embodiment is the convex portion. The switch 11 can be more easily triggered due to the structure of a convex shape (i.e., the trigger portion 42) contacting a plane (i.e., the switch 11).

Preferably, there is a first space S1 between the metal member 40 and the contact pillar 33, as shown in FIG. 2B. The first space S1 between the metal member 40 and the contact pillar 33 is located on the opposite side of the trigger portion 42. Preferably, the first space S1 is greater than 0.05 mm. The first space S1 provides a space for the metal member 40 to rebound. Specifically, when the keycap 20 is pressed, the collapse and deformation of the elastic member 30 provide the first tactile feedback. Next, after the trigger portion 42 of the metal member 40 moves downward and touches the switch 11 of the circuit board 10, the trigger portion 42 rebounds toward the first space S1 (i.e., the collapse and deformation of the metal member 40) to provide the second tactile feedback. In other words, when the user taps the key structure 1 of this embodiment, the user can feel the successive tactile feedbacks (i.e., the first and second tactile feedbacks described above) and hear the sound generated by the impact and the rebound of the metal member 40. This kind of tapping experience is similar to the tapping experience of a key with a mechanical switch.

Figure 3:
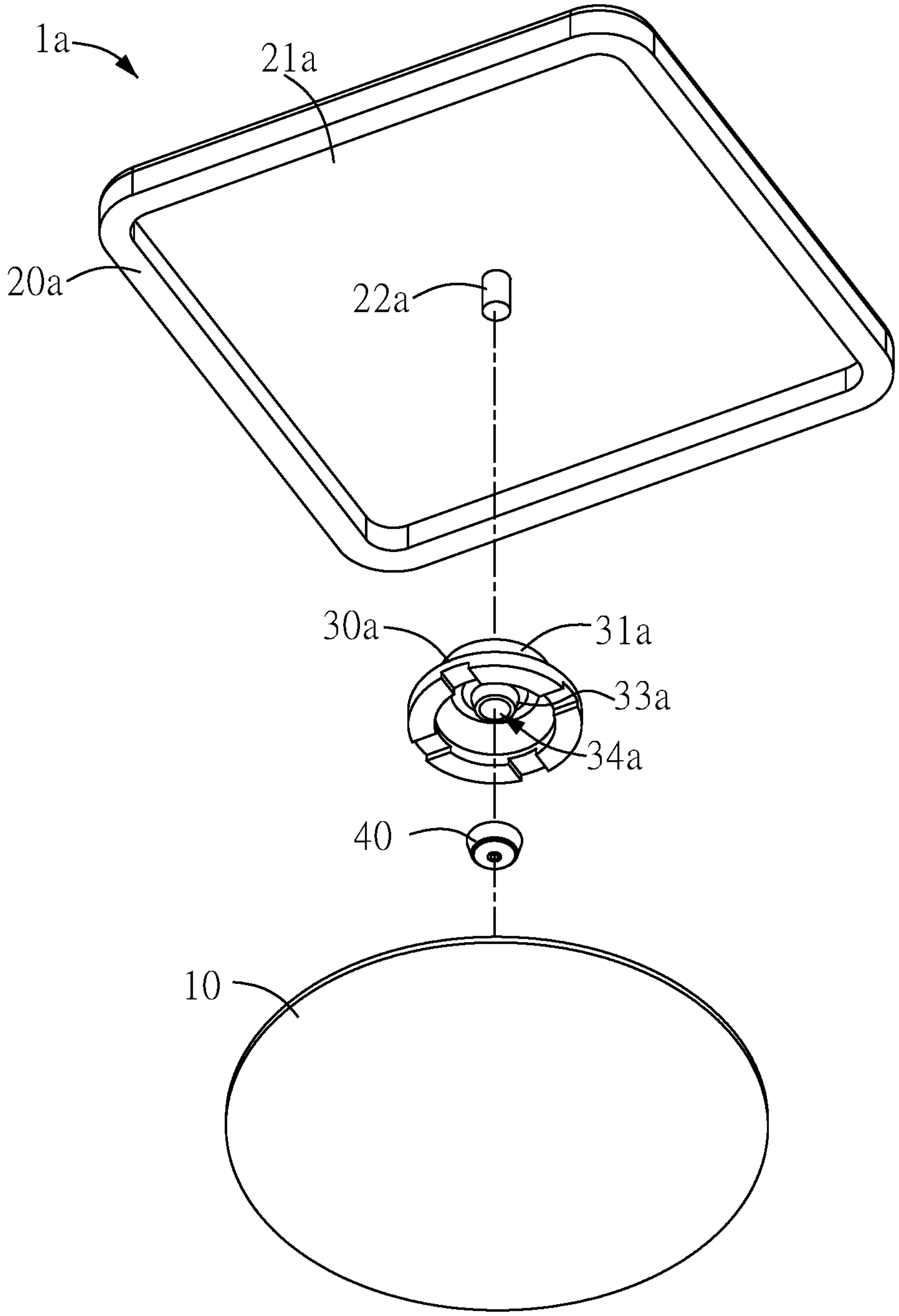
FIG. 3 is an exploded schematic diagram of a key structure according to the second embodiment of the disclosure.
Figure 4A:
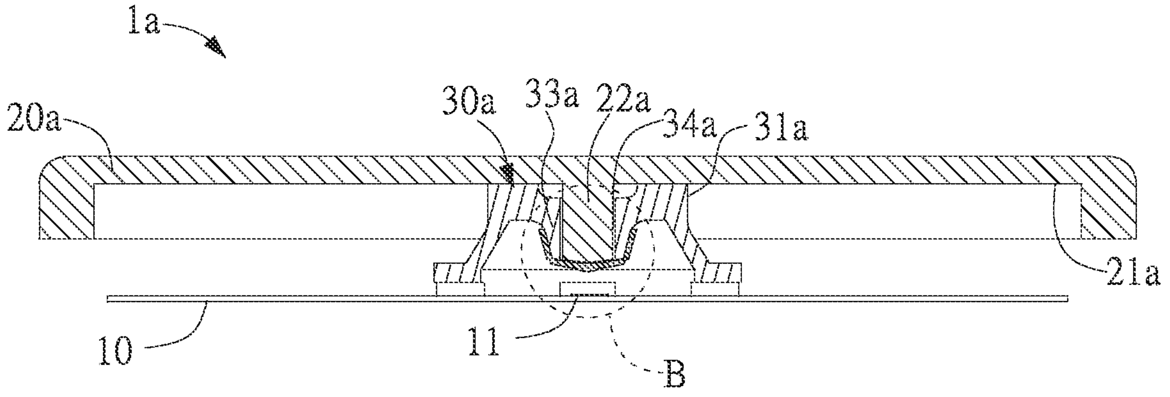
FIG. 4A is a sectional schematic diagram of the key structure shown in FIG. 3 in the assembled state.
Figure 4B:
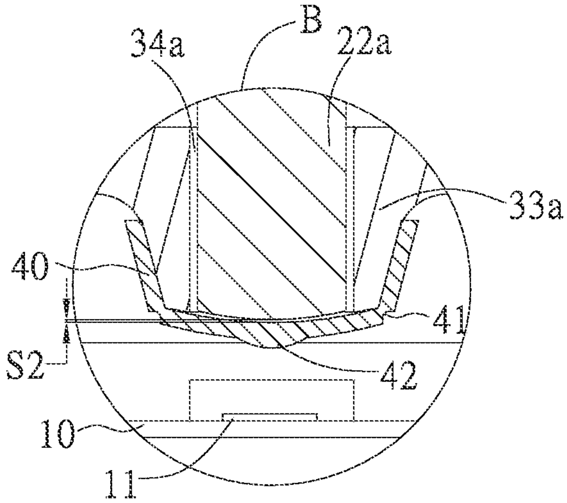
FIG. 4B is an enlarged view of a circled area B shown in FIG. 4A.

With reference to FIG. 3, FIG. 4A and FIG. 4B. FIG. 3 is an exploded schematic diagram of a key structure according to the second embodiment of the disclosure; FIG. 4A is a sectional schematic diagram of the key structure shown in FIG. 3 in the assembled state; and FIG. 4B is an enlarged view of a circled area B shown in FIG. 4A. The main difference between the key structure 1*a* of this embodiment and the first embodiment is the keycap 20*a*. The keycap 20*a* of this embodiment further comprises a rib 22*a*. The rib 22*a* is disposed on the bottom 21*a* and extends from the bottom 21*a* toward the circuit board 10. Correspondingly, the elastic member 30*a* further comprises a through hole 34*a*. The through hole 34*a* is located in the contact pillar 33*a* and penetrates through the dome portion 31*a* and the contact pillar 33*a* such that the rib 22*a* can be accommodated in the through hole 34*a*. The structures of the circuit board 10 and the metal member 40 are same as those of the first embodiment and are denoted by the same reference numerals.

The rib 22*a* is disposed in the contact pillar 33*a* of the elastic member 30*a* such that the rib 22*a* corresponds to the trigger portion 42 and the switch 11 of the circuit board 10. When the keycap 20*a* is pressed, the metal member 40 is pressed down by the rib 22*a* such that the trigger portion 42 contacts the switch 11 to generate the corresponding input signal. In this embodiment, the keycap 20*a* and the rib 22*a* are made of plastic material, which is less deformable than the rubber material of the elastic member 30*a*. Thus, the rib 22*a* can transmit the pressing force to the trigger portion 42 effectively to ensure that an input signal can be generated in every tapping operation.

In this embodiment, there is a second space S2 between the metal member 40 and the rib 22*a*, which is also a space for the metal member 40 to rebound. Preferably, the second space S2 is greater than 0.05 mm. Thus, when the key structure 1*a* of this embodiment is pressed, the successive tactile feedbacks and the sound generated by the impact and rebound of the metal member 40 can also be provided, such that the tapping experience is similar to the tapping experience of a key with a mechanical switch.

Figure 5:
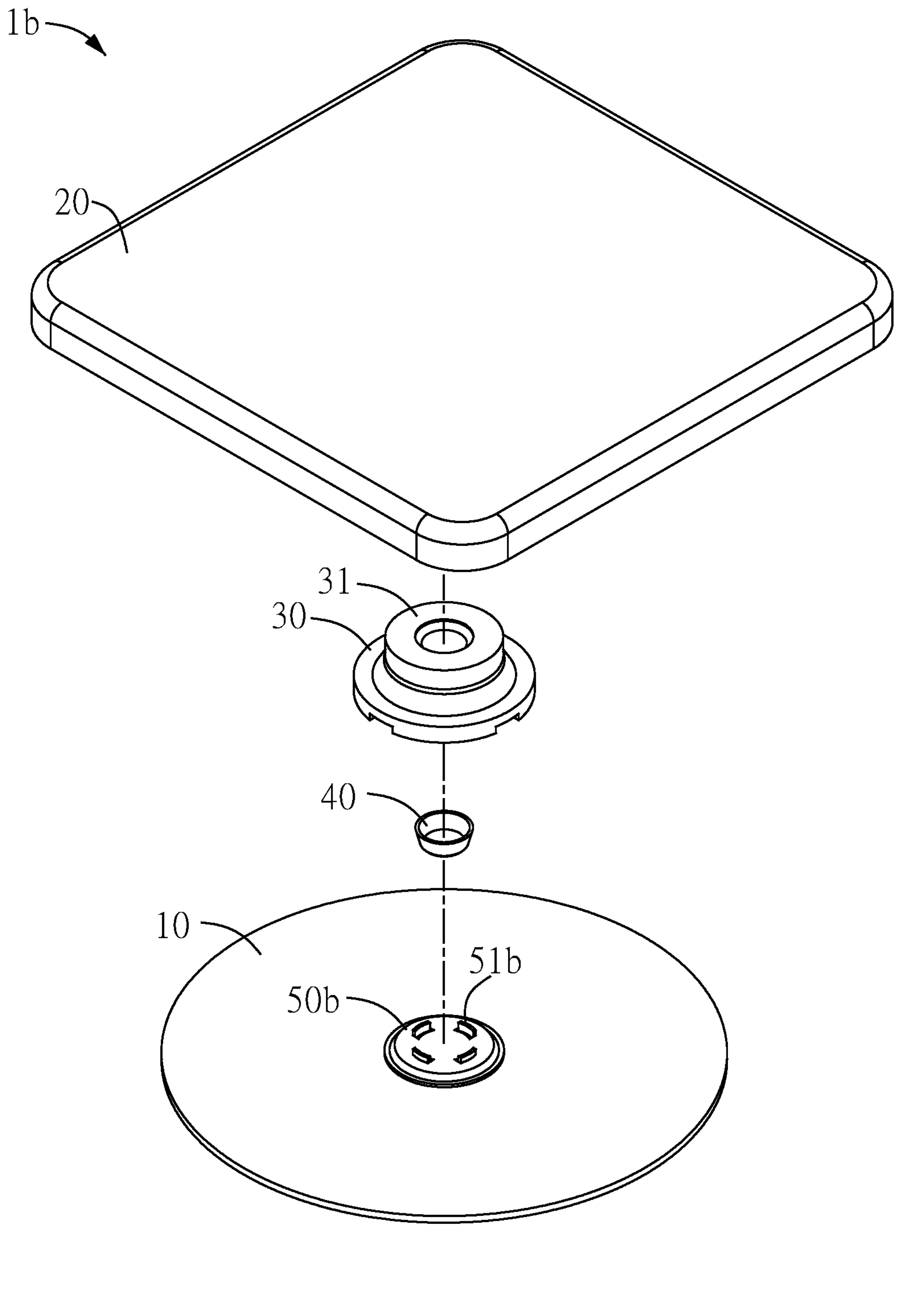
FIG. 5 is an exploded schematic diagram of a key structure according to the third embodiment of the disclosure.
Figure 6A:
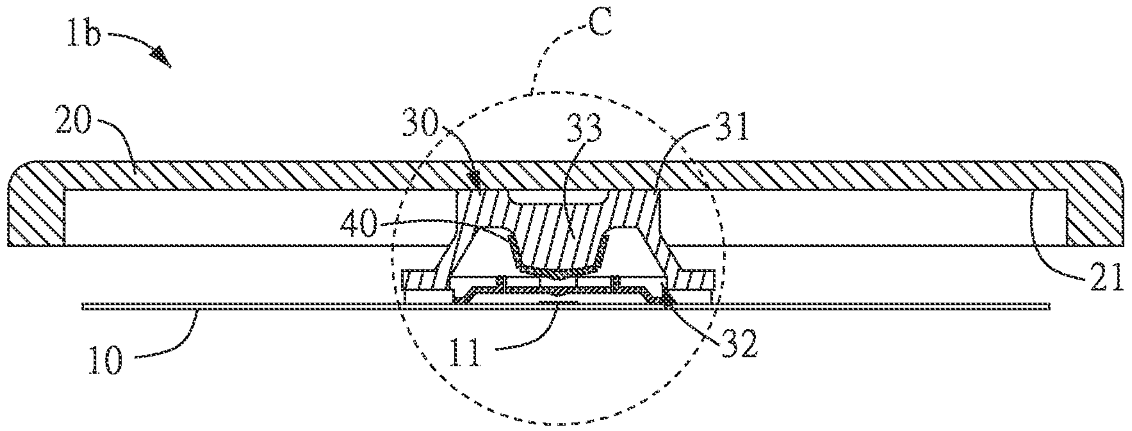
FIG. 6A is a sectional schematic diagram of the key structure shown in FIG. 5 in the assembled state.
Figure 6B:
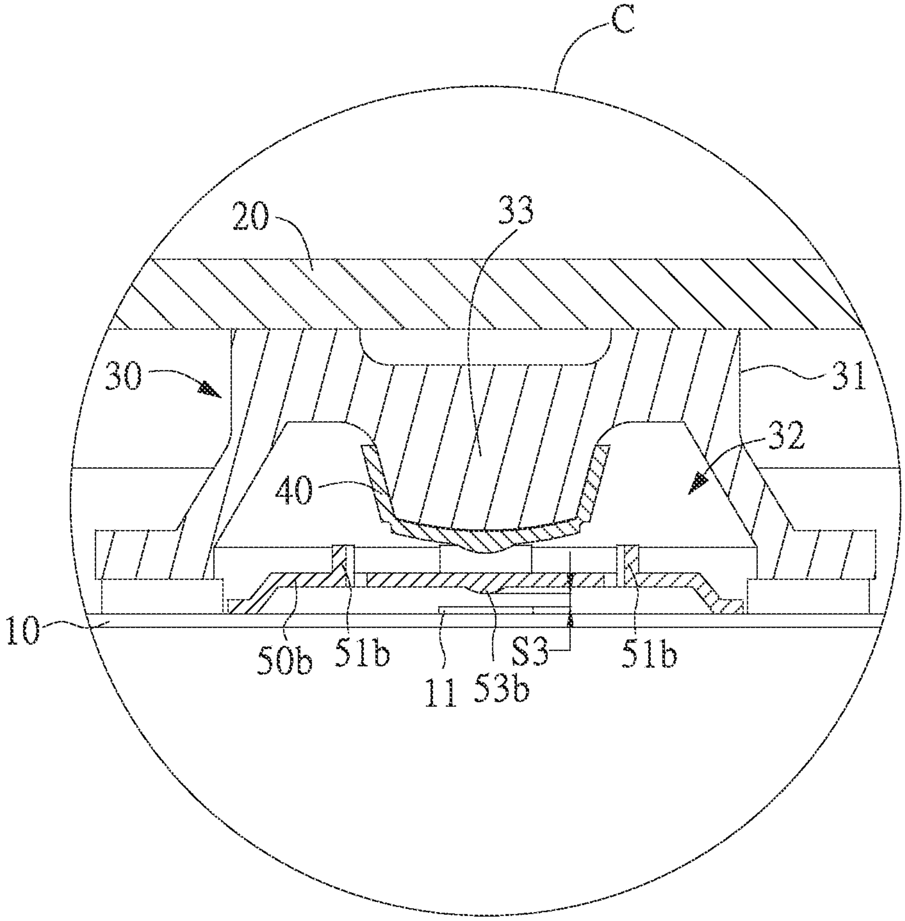
FIG. 6B is an enlarged view of a circled area A shown in FIG. 6A.

With reference to FIG. 5, FIG. 6A and FIG. 6B. FIG. 5 is an exploded schematic diagram of a key structure according to the third embodiment of the disclosure; FIG. 6A is a sectional schematic diagram of the key structure shown in FIG. 5 in the assembled state; and FIG. 6B is an enlarged view of a circled area A shown in FIG. 6A. The main difference between the key structure 1*b* of this embodiment and the first embodiment is that the key structure 1*b* further comprises a metal dome 50*b*. The structures of the circuit board 10, the keycap 20, the elastic member 30 and the metal member 40 are same as those of the first embodiment and are denoted by the same reference numerals.

The metal dome 50*b* of this embodiment is disposed on the circuit board 10 and located in the hollow portion 32 of the elastic member 30, as shown in FIG. 6A and FIG. 6B. When the keycap 20 of the key structure 1*b* is pressed, the elastic member 30 collapses and deforms such that the metal member 40 moves downward to touch the metal dome 50*b*. Next, the metal dome 50*b* contacts the switch 11 of the circuit board 10 and generates the input signal. When the user taps the key structure 1*b* of this embodiment, the user can feel the first tactile feedbacks provided by the collapse and deformation of the elastic member 30, feel the second tactile feedback and hear the sound provided by the impact of the metal member 40 and the metal dome 50*b*, which together resemble the tapping experience of a key with a mechanical switch. Furthermore, there is a third space S3 between the metal dome 50*b* and the circuit board 10. Thus, after the metal dome 50*b* contacts the circuit board 10, the metal dome 50*b* rebounds toward the third space S3 to provide the second tactile feedback. The successive tactile feedbacks (i.e., the first and second tactile feedbacks described above), the impact sound generated by two metal elements (i.e., the metal member 40 and the metal dome 50*b*), and the sound provided by the collapse and deformation of the metal dome 50*b* can make the tapping experience of the key structure 1*b* closer to the tapping experience of a key with a mechanical switch.

It should be noted that, in this embodiment, there is no space between the metal member 40 and the contact pillar 33; that is, the key structure 1*b* does not have the first space S1 of the key structure 1. In other words, the contact pillar 33 of the elastic member 30 directly abuts the metal member 40. Thus, when the key structure 1*b* is pressed, the amount of deformation of the metal member 40 is small, and the tapping experience of the key structure 1*b* is different from those of the key structures 1, 1*a* mainly due to the deformation of the metal dome 50*b*. In another embodiment, there is a space between the metal member and the contact pillar; that is, the key structure has both the first space and the third space. The disclosure is not limited to having only the first or the third space.

Furthermore, the metal dome 50*b* comprises at least one limiting portion 51*b*. The limiting portion 51*b* is located on a side of the metal dome 50*b* facing the contact pillar 33. The limiting portion 51*b* is used to limit the pressed metal member 40 within a range surrounded by the limiting portion 51*b*. Specifically, the metal dome 50*b* comprises a plurality of limiting portions 51*b*. The limiting portions 51*b* are disposed at intervals and outside of the metal member 40. Thus, when the keycap 20 is pressed, the contact pillar 33 and the metal member 40 on the outside thereof are located on the inner side of the limiting portion 51*b*. In other words, the metal member 40 is restricted to the inner side of the limiting portion 51*b*.

Because the friction coefficient between the two metal elements (i.e., the metal member 40 and the metal dome 50*b*) is small, they may be displaced when they are in contact with each other. For example, when the metal member 40 contacts the metal dome 50*b*, the metal member 40 may be displaced to outside of the metal dome 50*b* and slip off. In practical application, the pressed position may not be in the center of the keycap 20, so the direction of the collapse of the elastic member 30 can be any direction in a circle of 360 degrees. If a corner of the keycap 20 is heavily pressed, the collapse angle of the elastic member 30 will be too large, which may cause displacement of the metal member 40 on the outside of the elastic member 30 and such that the metal dome 50*b* cannot be pressed and collapse. In other words, the displacement and the slipping of the metal member 40 will make the metal dome 50*b* unable to move downward effectively such that the metal dome 50*b* cannot trigger the switch 11 to generate the input signal. In this embodiment, the metal dome 50*b* has limiting portions 51*b*, which can retain the metal member 40 within the inner side of the limiting portion 51*b* to prevent the metal member 40 from being displaced and slipping off and thereby to ensure that the switch 11 can be triggered effectively and generate the input signal.

In continuation of the description above, the key structure of the disclosure comprises a circuit board, a keycap, an elastic member and a metal member. Further, the elastic member comprises a dome portion, a hollow portion and a contact pillar. The hollow portion is located in the dome portion. The contact pillar is located in the hollow portion, and the contact pillar extends from the dome portion to the circuit board. The metal member covers an outside of the contact pillar. When a user presses the keycap of the key structure of the disclosure, the collapse and deformation of the elastic member can provide tactile feedback. At the same time, the contact pillar and the metal member outside thereof move downward and touch the circuit board so as to provide tactile feedback and the sound of the metal member contacting the circuit board. This tactile feedback and sound provided by the impact of the metal member resemble the tactile feedback provided by pressing a key with a mechanical switch and constitute improvement of the tactile feedback provided by a key structure with a rubber dome (i.e., the elastic member).

It is noted that the above-described embodiments are merely illustrative of preferred embodiments of the disclosure, and that in order to prevent redundancy, not all possible combinations of the variations are described in detail; various changes and modifications may be made to the described embodiments without departing from the scope of the disclosure as described by the appended claims

What is claimed is:

1. A key structure, comprising:
- a circuit board;
- a keycap having a bottom facing the circuit board;
- an elastic member disposed between the circuit board and the keycap, the elastic member comprising:
  - a dome portion touching the bottom of the keycap;
  - a hollow portion located in the dome portion; and
  - a contact pillar located in the hollow portion, the contact pillar extending from the dome portion to the circuit board; and
- a metal member only covering an outside of the contact pillar and not touching an inside of the dome portion, the metal member comprising a central portion, a side wall portion and a trigger portion, the side wall portion fitting the outside of the contact pillar, and the trigger portion being a convex portion extending from the central portion toward the circuit board.

2. The key structure as claimed in claim 1, wherein the metal member further comprises at least one weakening portion, and the metal member is bent at the at least one weakening portion and sleeved on the outside of the contact pillar.

3. The key structure as claimed in claim 2, wherein the at least one weakening portion is an annular structure.

4. The key structure as claimed in claim 1, wherein there is a first space between the metal member and the contact pillar.

5. The key structure as claimed in claim 1, wherein the circuit board comprises at least one switch, and the trigger portion corresponds to the at least one switch.

6. The key structure as claimed in claim 1, wherein the trigger portion has an outer edge and a center, and a thickness of the trigger portion gradually increases from the outer edge to the center.

7. The key structure as claimed in claim 1, wherein the keycap further comprises a rib disposed on the bottom, the elastic member further comprises a through hole located in the contact pillar, and the rib is accommodated in the through hole.

8. The key structure as claimed in claim 7, wherein there is a second space between the metal member and the rib.

9. The key structure as claimed in claim 1, further comprising:
- a metal dome disposed on the circuit board and located in the hollow portion of the elastic member; the metal dome comprises at least one limiting portion, and the at least one limiting portion is located on a side of the metal dome facing the contact pillar.

10. The key structure as claimed in claim 9, wherein when the keycap is pressed, the contact pillar is located inside the at least one limiting portion.

11. The key structure as claimed in claim 9, wherein there is a third space between the metal dome and the circuit board.

12. The key structure as claimed in claim 1, wherein the metal member is formed on the outside of the contact pillar by insert molding or injection molding.

* * * * *